(12) United States Patent
Croft (10) Patent No.: US 10,683,054 B2
(45) Date of Patent: Jun. 16, 2020

(54) BICYCLE FRAME ATTACHABLE KNEELING PAD

(71) Applicant: Walter Edwin Croft, San Mateo, CA (US)

(72) Inventor: Walter Edwin Croft, San Mateo, CA (US)

(*) Notice: Subject to any disclaimer, the term of this patent is extended or adjusted under 35 U.S.C. 154(b) by 325 days.

(21) Appl. No.: 15/715,224

(22) Filed: Sep. 26, 2017

(65) Prior Publication Data

US 2019/0092416 A1    Mar. 28, 2019

(51) Int. Cl.
| | |
|---|---|
| B62K 19/40 | (2006.01) |
| B62J 25/00 | (2020.01) |
| B62M 1/36 | (2013.01) |
| B62M 1/26 | (2013.01) |

(52) U.S. Cl.
CPC ............ *B62K 19/40* (2013.01); *B62J 25/00* (2013.01); *B62M 1/26* (2013.01); *B62M 1/36* (2013.01)

(58) Field of Classification Search
CPC ............ B62K 19/40; B62J 25/00; B62M 1/36
See application file for complete search history.

(56) References Cited

U.S. PATENT DOCUMENTS

| | | | | |
|---|---|---|---|---|
| 1,668,623 | A | * | 5/1928 | Avril ...................... B62K 3/002 280/87.021 |
| 1,685,614 | A | | 9/1928 | Peacock |
| 2,710,207 | A | | 6/1955 | Mueller |
| 4,909,526 | A | | 3/1990 | Vazin |
| 5,395,017 | A | | 3/1995 | Naughton |
| 6,010,434 | A | | 1/2000 | Hodges |
| 6,634,660 | B2 | * | 10/2003 | Miller .................. A61H 3/04 135/67 |
| 6,848,696 | B2 | | 2/2005 | Miller |
| 7,780,180 | B2 | | 8/2010 | Hoepner et al. |
| 7,878,513 | B2 | | 2/2011 | Damouzehtash |
| 8,348,288 | B1 | | 1/2013 | Laughon, Sr. |
| 9,610,997 | B1 | * | 4/2017 | Croft ...................... B62K 5/023 |
| 2004/0061299 | A1 | * | 4/2004 | Garner .................. B62K 3/002 280/87.041 |
| 2014/0097592 | A1 | | 4/2014 | Smith |
| 2016/0229483 | A1 | * | 8/2016 | Zhou ...................... B62M 1/12 |
| 2016/0244123 | A1 | * | 8/2016 | Zhou ...................... B62M 1/36 |
| 2017/0174283 | A1 | * | 6/2017 | Wright .................. B62K 3/002 |

* cited by examiner

*Primary Examiner* — Jacob D Knutson
(74) *Attorney, Agent, or Firm* — Williams Intellectual Property; Timothy Snyder (57) ABSTRACT

A bicycle frame attachable kneeling pad is described. The bicycle frame attachable kneeling pad is adaptable to a standard bicycle to provide new coaster usage where a user can propel forward with an active push leg, like a scooter, while resting a passive or compromised leg in the kneeling pad. The bicycle frame attachable kneeling pad includes a kneeling pad for supporting a user's passive or compromised leg while coasting on the bicycle, and a frame assembly for facilitating the assembly of the kneeling pad to the bicycle frame. The frame assembly may further include one or more crank arms that are attachable to a bottom bracket of the bicycle. The crank arms may then assemble with the frame member to ultimately attach the kneeling pad to the bicycle frame to provide the new coaster usage.

18 Claims, 8 Drawing Sheets

BICYCLE FRAME ATTACHABLE KNEELING PAD

BACKGROUND OF THE INVENTION

Various types of bicycles are known in the prior art. Generally, to operate a traditional bicycle a user needs two functioning legs to operate the pedals to crank the wheels. However, if one of the user's legs becomes compromised, due to injury for example, then the user is unable to operate their bicycle. In other scenarios, a user may desire a different bike riding experience that requires the use of only one leg for locomotion. In which case, the user must purchase a different type of bicycle or other locomotion device altogether. Thus, there is a need for a bicycle frame attachable kneeling pad that includes a kneeling pad disposed upon a frame assembly for coupling to a bicycle frame, said frame assembly disposed on one side of the bicycle frame and between a directable front wheel and at least one rear wheel, wherein a user is enabled to kneel upon the kneeling pad with one leg and probel the bicycle at a desired velocity by use of the other leg in striding contact with a ground surface.

FIELD OF THE INVENTION

The present invention relates to a bicycle frame attachable kneeling pad, and more particularly, to a kneeling pad attachable to a bicycle to provide new coaster usage where a user can propel forward with an active push leg, like a scooter, while resting a passive or compromised leg in a kneeling pad.

SUMMARY OF THE INVENTION

The general purpose of the bicycle frame attachable kneeling pad, described subsequently in greater detail, is to provide a bicycle frame attachable kneeling pad which has many novel features that result in a bicycle frame attachable kneeling pad which is not anticipated, rendered obvious, suggested, or even implied by prior art, either alone or in combination thereof.

A bicycle frame attachable kneeling pad is provided having a frame assembly attachable to a bicycle frame. The frame assembly being supportive of a kneeling pad dispositional at one side of the bicycle frame at a height and position appropriate for engaging a user's knee thereupon while riding the bicycle. The user being enabled to kneel upon one knee and propel the bicycle by striding action effected by said user's other leg. The frame assembly may further include a frame member and a plurality of assembly components. The assembly components may include a first crank arm attachable to the bicycle frame through a bottom bracket of said bicycle frame and at least one collar fastening element for securing a tube of the bicycle frame to the frame assembly. The frame member is attachable to the first crank arm and secured thereto parallel to the bicycle frame to position the kneeling pad on one or alternately the other side of a bicycle approximately midway between a saddle of the bicycle and a ground surface upon which said bicycle is uprightly disposed.

The bicycle frame attachable kneeling pad may further include a first crank arm attachable to a first side of the bicycle frame through a bottom bracket of said bicycle, and a second crank arm attachable to an opposing side of the bicycle frame through the bottom bracket. The first crank arm and second crank arm are cross-connected with one or more fastening elements traversing between the first crank arm and second crank arm to improve the stability of the kneeling pad when attached to the bicycle frame. At least one collar fastening element may be disposed to secure around a seat tube of the bicycle frame and couple to one or more of the fastening elements traversing between the first crank arm and second crank arm to secure the frame member to the seat tube.

The frame member may include a vertical portion disposed parallel to the bicycle frame, where the vertical portion is attachable to either the first crank arm or second crank arm depending on which side the user desires to assemble the kneeling pad on the bicycle frame. The frame member may further include a first kneeling pad assembly portion disposed parallel to a longitudinal axis of kneeling pad, and a second kneeling pad assembly portion disposed parallel to the longitudinal axis of the kneeling pad and horizontally offset from the first kneeling pad such that the kneeling pad is cradle between the first kneeling pad assembly portion and second kneeling pad assembly portion. An angled portion may endwise connect with the vertical portion and second kneeling pad assembly portion to provide three-dimensional support to the kneeling pad.

A bicycle frame attachable kneeling pad kit is also provided. The kit includes a kneeling pad configured to support a user's leg while operating a bicycle, a frame member configured to support the kneeling pad and facilitate the assembly of the kneeling pad to the bicycle frame, at least one crank arm configured to attach to a spindle of the bicycle frame and the frame member, and a plurality of fastening elements including a collar fastening element configured to secure the frame member or kneeling pad to a tube of the bicycle frame.

Thus has been broadly outlined the more important features of the present bicycle frame attachable kneeling pad so that the detailed description thereof that follows may be better understood and in order that the present contribution to the art may be better appreciated.

Objects of the present bicycle frame attachable kneeling pad, along with various novel features that characterize the invention are particularly pointed out in the claims forming a part of this disclosure. For better understanding of the bicycle frame attachable kneeling pad, its operating advantages and specific objects attained by its uses, refer to the accompanying drawings and description.

BRIEF DESCRIPTION OF THE DRAWINGS

Examples illustrative of embodiments are described below with reference to the figures attached hereto. In the figures, identical structures, elements or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

FIGURES

FIGS. 1A-1B depict the bicycle frame attachable kneeling pad, where

FIGS. 2A-2B depict a kneeling pad and frame member, where

FIGS. 3A-3B depict a closer view of the kneeling pad and footrest attached to a bicycle frame, where

FIGS. 5A-5B depicts another configuration of a footrest assembly where

FIGS. 6A-6C depicts a kneeling pad attachable to a bicycle frame with one or more frame members, where

FIGS. 7A-7B depict a kneeling pad attachable to a bicycle frame with one or more crank arms, where

FIGS. 8A-8B depict a kneeling pad attachable to a bicycle frame with a panel mount, where

DETAILED DESCRIPTION

The present invention has utility as a bicycle frame attachable kneeling pad to provide a user with the ability to operate a bicycle with one leg while resting an opposing leg on the kneeling pad. The bicycle frame attachable kneeling pad is particularly advantageous for a user with one compromised leg; however, it will be appreciated that a user with no compromised legs may use the kneeling pad as a fun alternative for operating a bicycle. The following description of various embodiments of the invention is not intended to limit the invention to those specific embodiments, but rather to enable any person skilled in the art to make and use this invention through exemplary aspects thereof.

As used herein, the term 'fastening element' refers to several types of fasteners including, for example, screws, nails, pins, rivets, nuts and bolts, clamps (e.g., swivel-clamps, Hoffman clamps, circular vice clamps), clasps, hook and loop fasteners (e.g. Velcro®), zip-ties, circular pipe straps, cordage, or quick connect couplers. The term 'collar fastening element' refers more particularly to a fastener capable of fastening, securing, holding, supporting, or connecting a first structure to a tubular-like structure, such as the tubes of a bicycle. Examples of a 'collar fastening element' include a swivel clamp, Hoffman clamp, circular vice clamp, clasps, hook and loop fasteners, zip-ties, circular pipe straps, or cordage.

With reference now to the drawings, and in particular FIGS. 1A through 8B thereof, examples of the instant bicycle frame attachable kneeling pad employing the principles and concepts of the present bicycle frame attachable kneeling pad and generally designated by the reference number 100 will be described.

Figure 1A:
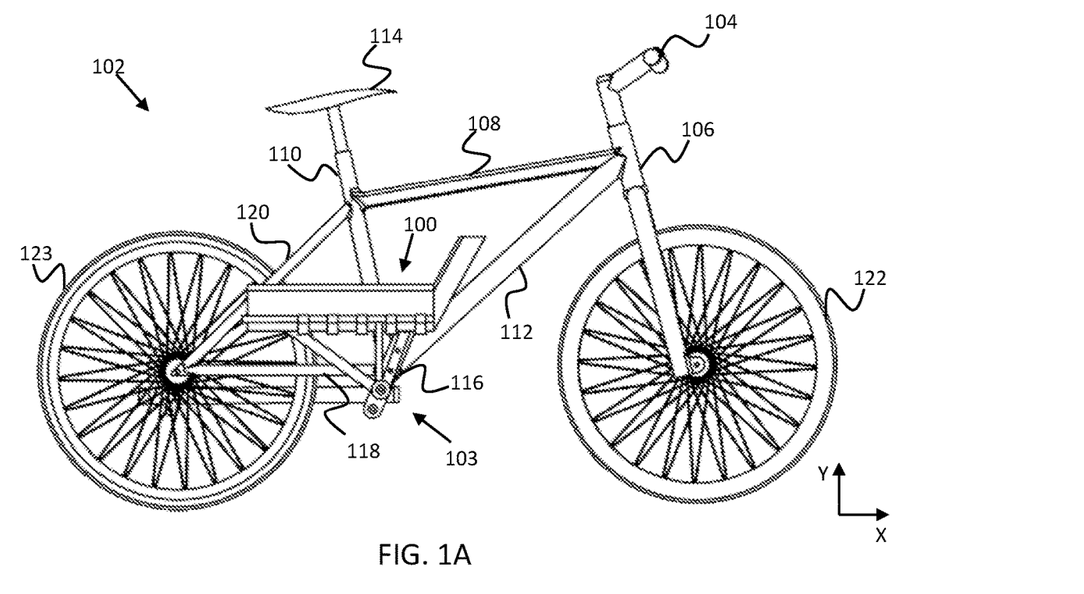
FIG. 1A is a kneeling pad side view thereof.

In a preferred embodiment, with reference to FIGS. 1A through 4B, a bicycle frame attachable kneeling pad 100 is shown attached to a bicycle 102. FIGS. 1A-1C depict an attachable kneeling pad 100 and an attachable footrest 101 assembled to a bicycle frame 102 with the aid of a frame assembly 103, where FIG. 1A depicts a kneeling pad side view of the bicycle 102, FIG. 1B depicts a footrest side view of the bicycle 102, and FIG. 1C depicts a top view of the bicycle 102. The bicycle 102 may include traditional components of a standard bicycle such as handlebars 104, a head tube 106, a top tube 108, a seat tube 110, a down tube 112, a saddle 114, a bottom bike bracket 116, a chainstay 118, a seat stay 120, a front wheel 122, and a rear wheel 123. However, it should be appreciated that the kneeling pad 100 and footrest 101 may be applied to various bicycle frame types.

Figure 1B:
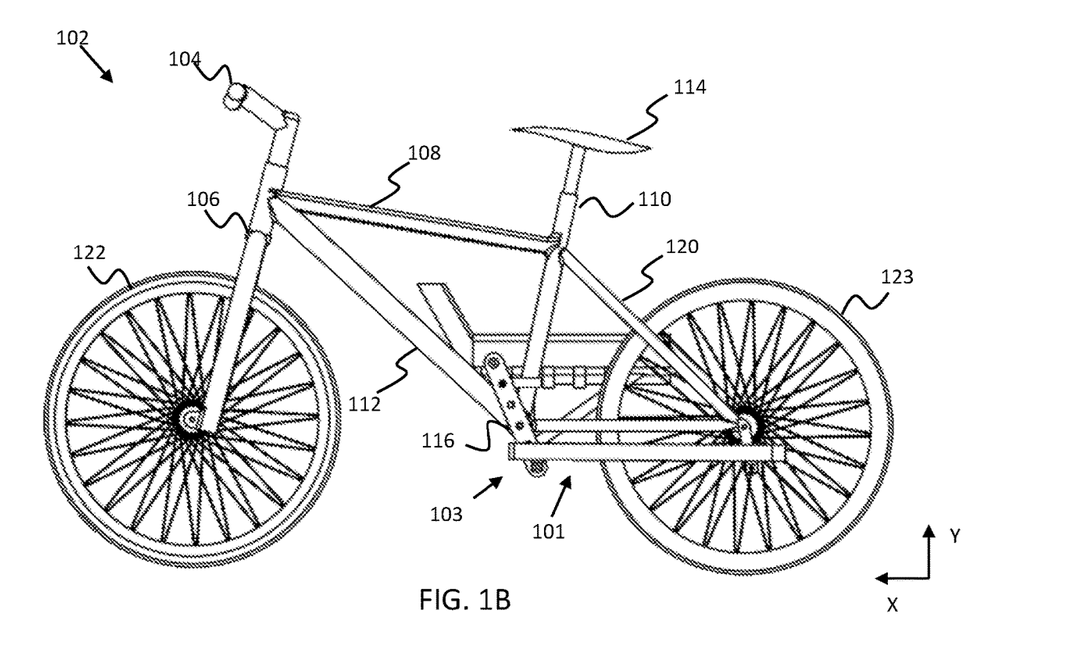
FIG. 1B is a footrest side view thereof.
Figure 1C:
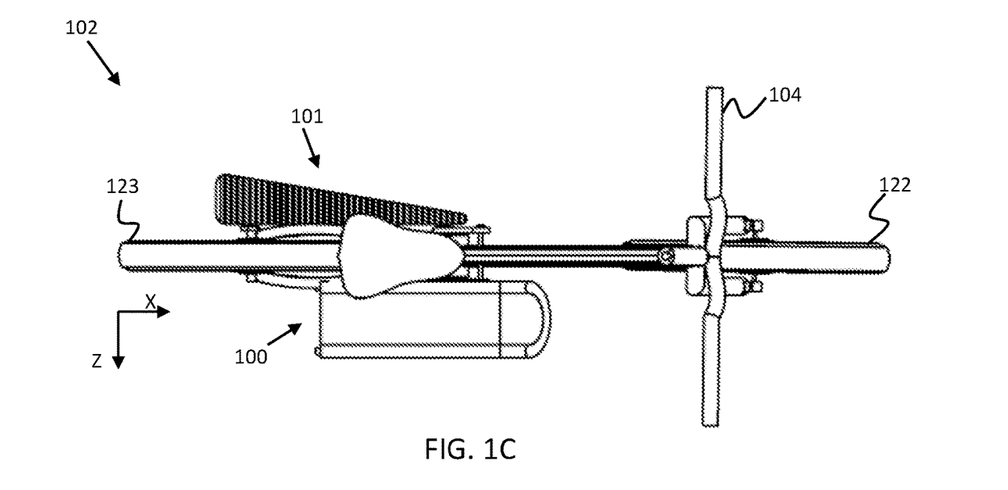
FIG. 1C is a top view thereof.

The kneeling pad 100 and footrest 101 are generally configured to be an adaptation to a bicycle 102 to provide new coaster usage. The kneeling pad 100 is configured to support a compromised or passive leg and the footrest 101 is configured to support the active push leg while the user is coasting. The frame assembly 103 is configured to facilitate the assembly of the kneeling pad 100 and/or footrest 101 to bicycle 102. The bicycle is propelled forward with the user's active push leg, like a scooter, while the passive leg is supported and rests in the kneeling pad 100. Further details of embodiments of the kneeling pad 100, the footrest 101, and frame assembly 103 are further described below.

Figures 2A, 2B:
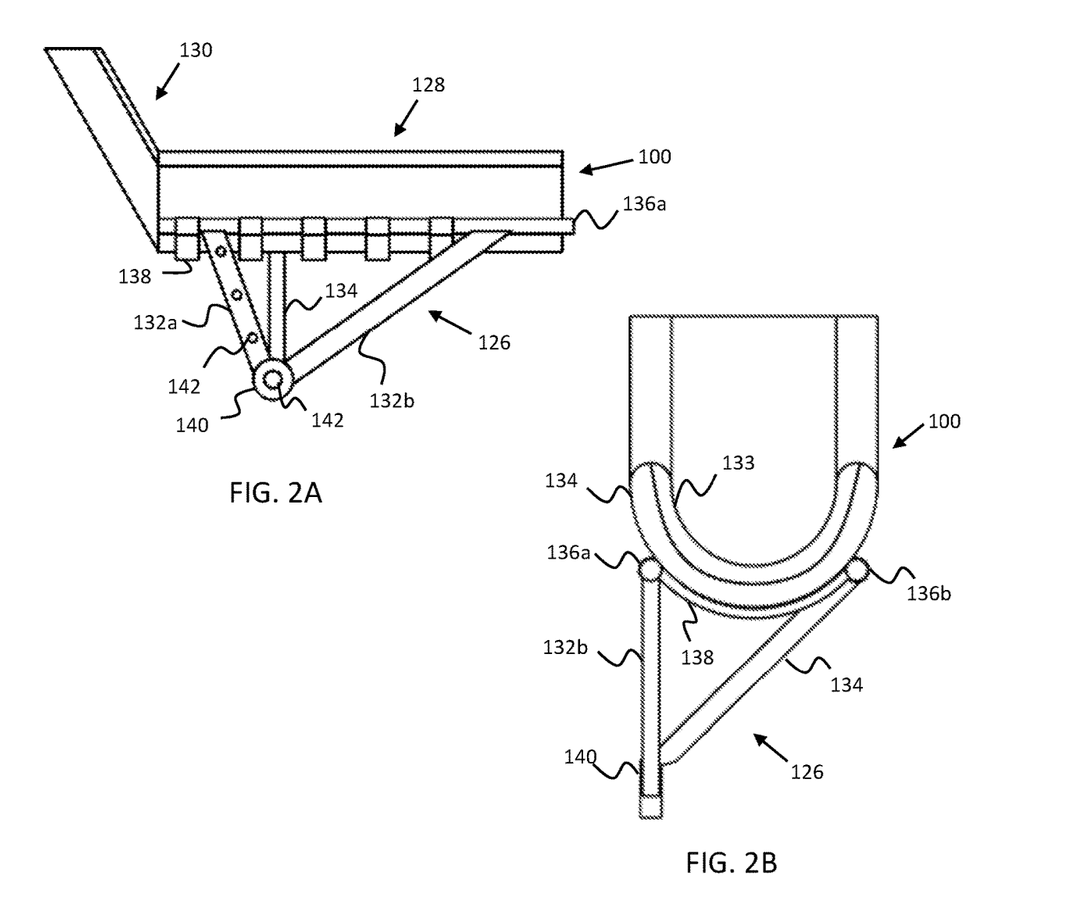
FIG. 2A is a side view thereof and FIG. 2B is rear view thereof.

With reference to FIGS. 2A-2B, a particular embodiment of a kneeling pad 100 supported by a frame member 126 is shown, where FIG. 2A is a side view thereof and FIG. 2B is rear view thereof. The kneeling pad 100, in more detail, may include a lower leg rest portion 128 and an upper leg rest portion 130. The lower leg rest portion 128 is configured to support a user's lower leg, while the upper leg rest portion 130 is configured to support a user's upper leg above the knee. The upper leg rest portion 130 provides a stop point to prevent the user from sliding forward (if the user brakes hard for example). The upper leg portion 130 may be assembled to the lower leg portion 128 to permit the user to adjust the position (e.g., rotate or translate) of the upper leg portion 130 relative to the lower leg portion 128, or to remove the upper leg portion 130 from the kneeling pad 100 altogether. Alternatively, the lower leg portion 128 and upper leg portion 130 are manufactured as a single unit. In a particular embodiment, the kneeling pad 100 has a similar structure as a baseball catcher's shin guard in that the kneeling pad 100 has a padded portion 133 disposed on top of a support structure 134. The padded portion 133 makes contact with the user's leg, or a user's cast (if the leg is broken or injured). The padded portion may be made and formed from one or more polymeric or textile materials known in the art to provide a comfortable surface for the user's leg. The support 134 may be made of one or more rigid or semi-rigid polymeric materials or metals. In other embodiments, the kneeling pad 100 only includes a padded portion 133 or a support structure 134. The kneeling pad 100 may further include an ankle and upper foot support (not shown) positioned at a rear end of the kneeling pad 100 and configured to support the user's ankle and upper foot similar to a baseball catcher's shin guard.

In specific embodiments, the lower leg rest portion 128 and/or upper leg rest portion 130 are preferably formed in a shape that: a. cradle the leg such that the leg is less likely to come out of the kneeling pad 100 and provide comfort to the user; b. provide the user with confidence and trust while using the bicycle 102 with the kneeling pad 100; and c. allow the user to feel more connected to the kneeling pad 100, yet not strapped down or hindered. Therefore, the lower leg rest portion 128 and/or upper leg rest portion 130 may be constructed to have a concave shape, a partial arc shape, a V-shape, a channel shape, or have a shape/properties analogous to a sling or hammock. Any of the shapes may be straight, tapered end to end, or custom formed directly to the user. However, it should be appreciated that the lower leg rest portion 128 and/or upper leg rest portion 130 may be formed or shaped in a variety of different shapes as desired by a user, such as a straight, flat, non-concave, platform. In addition, the structure of the lower leg rest portion 128 and/or upper leg rest portion 130 may be made of one or more materials to form a continuous structure (i.e., no holes or gaps), a discontinuous structure (e.g. the kneeling pad 100 may have an opening at the bottom of the kneeling pad 100), and may be symmetrical or asymmetrical about a center longitudinal axis of the kneeling pad 100. A symmetrical kneeling pad 100 may work best if the kneeling pad 100 is sold as a kit, where the kneeling pad 100 may accommodate multiple user's sizes and shapes. An asymmetrical kneeling pad 100 may be custom fitted and canted to a user's specific leg shape or designed for specific leg braces. The kneeling pad 100 may be constructed using methods known in the art such as traditional mechanical assembly, formed composite, three-dimensional (3-D) printing, milled (subtractive manufacturing), welding, molded, woven, or a combination thereof.

The frame member 126 may be a part of the frame assembly 103 and is configured to support the kneeling pad 100 and facilitate the assembly of the kneeling pad 100 to the frame of the bicycle 102. The frame member 126 may include one or more vertical portions (132a, 132b) configured to be mounted parallel to the frame of the bicycle 102. For clarification, the direction of 'vertical' refers to the direction of the ground surface to the saddle 116 of the bicycle 102 when the bicycle is upright (i.e. a sagittal plane or X-Y plane). The frame member 126 may further include one or more angled portions 134 angularly extending horizontally (Z-direction) away from the frame of the bicycle 102, to provide support to an outer region of the kneeling pad 100. The frame member 126 may further include one or more kneeling pad assembly portions (136a, 136b) for connecting and/or supporting the frame member 126 with the kneeling pad 100. In one embodiment, the kneeling pad assembly portion(s) (136a, 136b) may be arranged parallel to the longitudinal axis of the kneeling pad 100, in an X-direction. In another embodiment, the kneeling pad assembly portion(s) (136a, 136b) may extend horizontally, in a frontal Y-Z plane, from the vertical portions (132a, 132b) and connect with an end of an angled portion 134. The kneeling pad 100 may assemble to the kneeling pad assembly portion(s) (136a, 136b) with fastening elements. In another embodiment, the kneeling pad 100 may have a built-in receiving element, such as a sleeve or loops, where the kneeling pad assembly portion(s) (136a, 136b) slides into the sleeve and are subsequently fastened to kneeling pad 100 with fastening elements. In yet another embodiment, the kneeling pad 100 and kneeling pad assembly portions frame (s) (136a, 136b) are assembled with an adhesive. Alternatively, the kneeling pad 100 and frame member 126 are manufactured as a single unit.

In the embodiment shown in FIGS. 2A-2B, the frame member includes a first kneeling pad assembly portion 136a disposed lengthwise along the longitudinal axis of the bicycle 102, and a second kneeling pad assembly portion 136b, likewise disposed lengthwise along a longitudinal axis of the bicycle 102 but horizontally offset by a distance from the first kneeling pad assembly portion such that the first kneeling pad assembly portion 136a and second kneeling pad assembly portion 136b cradle and support the kneeling pad 100 like a sling. One or more straps 138 may extend between the first kneeling pad assembly portion 136a and the second kneeling pad assembly portion 136b to form the sling to cradle the kneeling pad 100. The kneeling pad 100 may be further secured to the straps 138 or kneeling pad assembly portions (136a, 136b) with fastening elements. The frame member 126 may further include one or more junctions 140 where the vertical portions (132a, 132b) and angled portion 134 join and/or emanate from. The angled portion 134 may emanate from the junction 140 and connect with the second kneeling pad assembly portion 136b for 3-D support of the kneeling pad 100. The vertical portions (132a, 132b) and junction(s) may further include one or more attachment features 142 (e.g., holes, threads, ridges, groves, or indentations), to facilitate the assembly of the frame member 126 to the frame of the bicycle 102, as further described below. The frame member 126 is preferably constructed of one or more rigid polymeric materials or metals using manufacturing techniques known in the art such as those described above.

In a particular embodiment, the frame member 126 does not include kneeling pad assembly portions (136a, 136b). Rather, the vertical portions (132a, 132b) and angled portion 134 attach directly to the kneeling pad 100 using any of the construction mechanisms described above (e.g., fastening elements, adhesives, built-in receiving elements, and/or manufactured as a single unit). In addition, the frame member 126 may be symmetrically designed to permit a user to assemble the kneeling pad 100 on either side of the bicycle 102 the user desires to rest their leg. Further, the position of the frame member 126 and kneeling pad 100 may be adjusted relative to the frame of the bicycle for fore-aft stability and/or to meet the user's body size or needs. In a particular embodiment, the kneeling pad 100 may be removable from the frame member 126 and/or rotatable about the frame member 126 such that the user can always position and secure the upper leg rest portion 130 towards the front of the bicycle 102 and/or adjust the position of the kneeling pad 100 for fore/aft stability to meet the user's body size or needs. In other embodiments, a kit may be sold having two frame assemblies, one designed for a first side of the bicycle 102 and another designed for an opposing side of the bicycle 102.

Figure 3A:
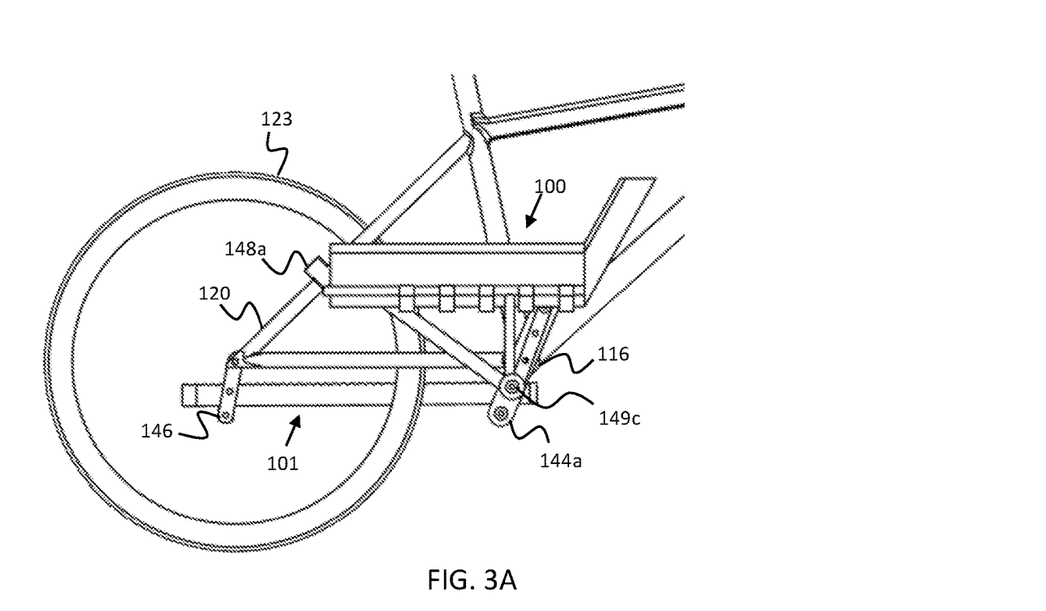
FIG. 3A is a kneeling pad side view thereof.
Figure 3B:
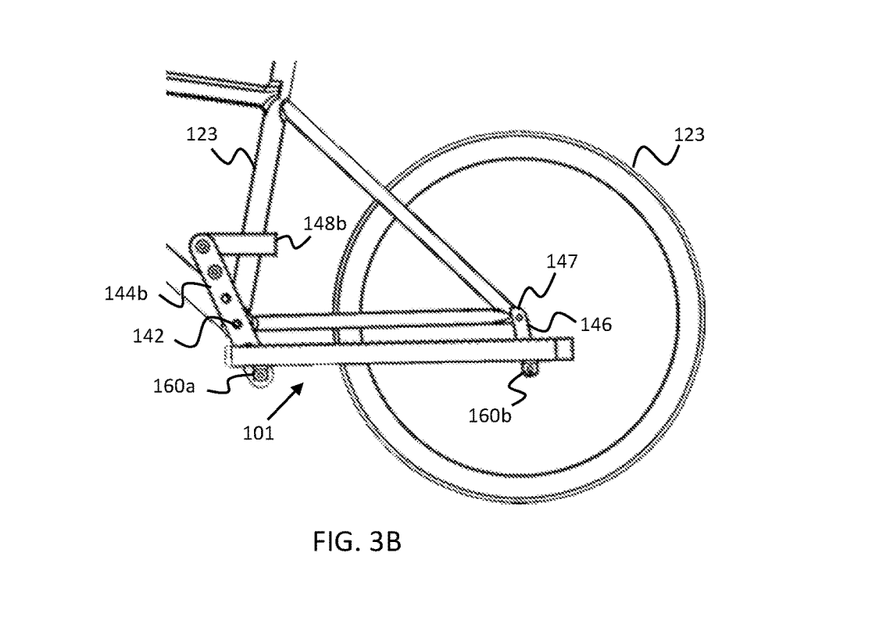
FIG. 3B is a footrest side view thereof.
Figure 4A:
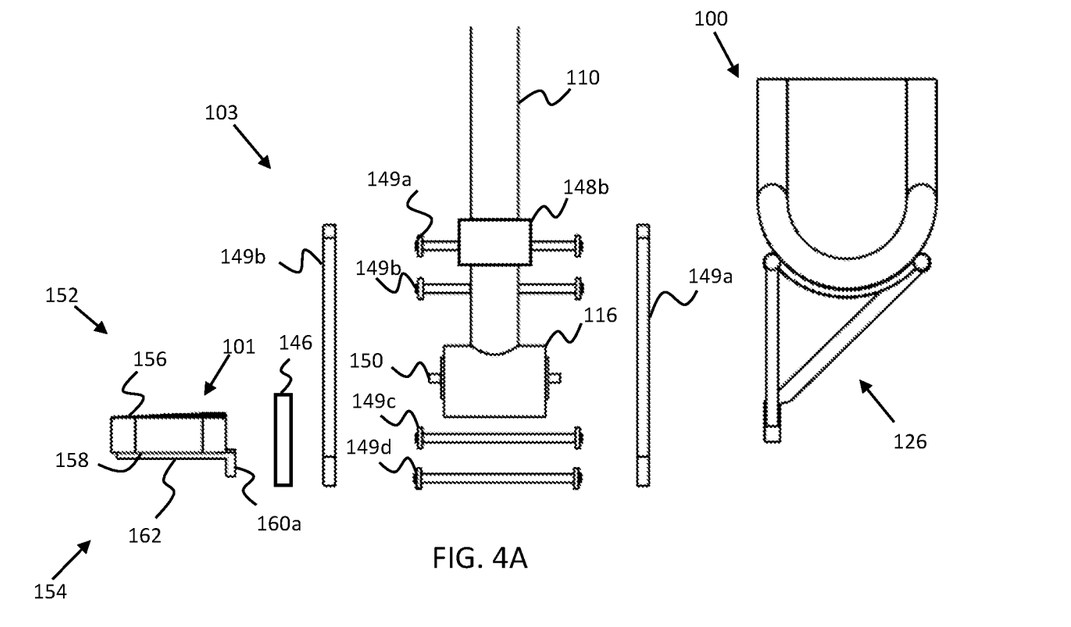
FIG. 4A depicts an exploded rear view of the assembly of the kneeling pad and footrest to a bicycle frame.
Figure 4B:
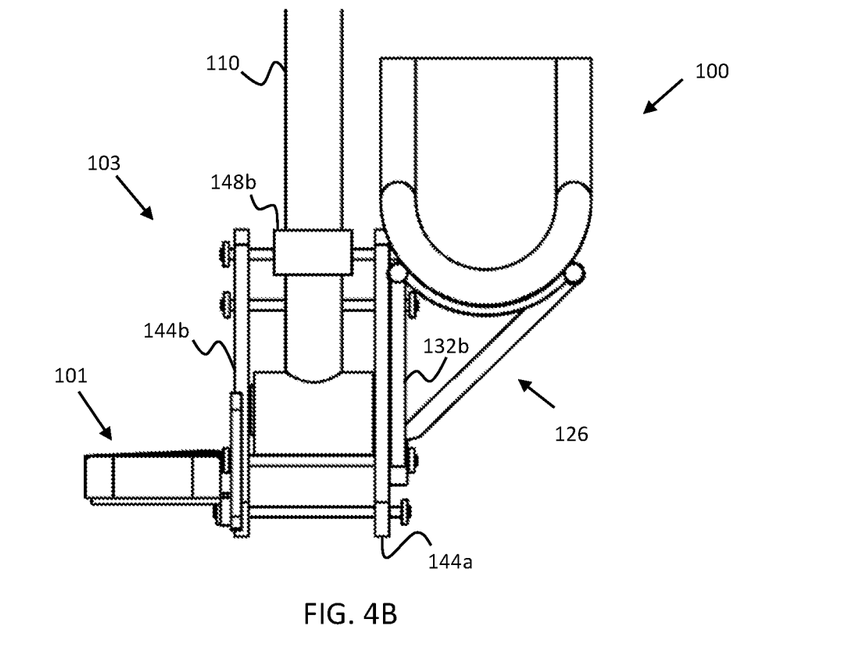
FIG. 4B depicts an assembled rear view of the kneeling pad and footrest to a bicycle frame.

With reference to FIGS. 3A-4B, the assembly of the kneeling pad 100 and footrest 101 is shown in more detail, where FIG. 3A is kneeling pad side view thereof, FIG. 3B is a footrest side view thereof (note, the spokes of the tires are not shown in FIGS. 3A-3B, nor is the kneeling pad assembly 124 shown in FIG. 3B, for visual clarity), FIG. 4A is an exploded rear view thereof and FIG. 4B is an assembled rear view thereof (note, a majority of the frame and tires are not shown in FIGS. 4A-4B for visual clarity). The frame assembly 103 further includes a plurality of assembly components to assemble the kneeling pad 100 to the frame of the bicycle 102. The assembly components may include one or more crank arms (144a, 144b), one or more brackets 146, and a plurality of fastening elements (148, 149). The cranks arms are configured to facilitate the assembly of the kneeling pad assembly 124 to the frame of the bicycle 102. The crank arm(s) (144a, 144b) act as the primary load support as they utilize the natural primary load point of the bicycle 102. The crank arm(s) (144a, 144b) and bracket(s) 146 are generally elongated bodies made of a rigid polymeric material or metal having a plurality of attachment features 142, such as holes. In a particular embodiment, the crank arm(s) (144a, 144b) and bracket(s) are made of lightweight, yet stiff and rigid material, such as aluminum alloy or stainless steel. In specific embodiments, the crank arms (144aa, 144b) are the native cranks of the bicycle 102 but with the pedals removed.

The kneeling pad assembly 124 may be assembled to the frame of the bicycle 102 as follows. The bicycle pedals, crankset, chain, and derailleurs are removed from the frame of the bicycle 102 if present. A first crank arm 144a and a second crank arm 144b are then assembled and fastened to opposing ends of a spindle 150, the spindle 150 being associated with the bottom bike bracket 116 of the bicycle 102. Attachment features (e.g., holes) on the crank arms (144a, 144b) may receive the ends of the spindle 150 and tighten thereto against the bottom bike bracket 116 with fastening elements (e.g., nuts). Subsequently, the frame member 126 is assembled and fastened to either the first crank arm 144a or second crank arm 144b depending on which side of the bicycle 102 the user desires to rest their leg. More specifically, an attachment feature 142 on the first vertical portion 132a and/or junction 140 of the frame member 126 may align with an attachment feature 142 on either the first crank arm 144a or second crank arm 144b. One or more crank arm fastening elements 149, such as long bolts, may fit through the attachment features 142 of the first crank arm 144a, the second crank arm 144b, the vertical portion(s) 132, and/or junction 140 and secured thereto. At least one of the crank arm fastening elements 149 assemble and secure the frame member 126 to one or both of the cranks arms (144a, 144b). The fastening elements 149 may further cross-connect the first crank arm 144a and second crank arm 144b from top to bottom for added stability and strength. The crank arm(s) (144a, 144b), brackets, and vertical portions (132a, 132b) may have several attachment features 142 that can align with one another to allow the user to assemble the kneeling pad 100 at various heights. The user may also rotate the crank arm 144a to adjust the height and orientation of the kneeling pad 100 to a desired position.

A first collar fastening element 148a (e.g., tube strap, hook and loop fastener, clamps, zip ties, cordage, collar bracket, swivel clamps) may assemble the kneeling pad 100 or frame member 124 to the seat stay 120 for aft lower leg load support. A second collar fastening element 148b may assemble and secure about the seat tube 110 and couple to the fastening elements 149 traversing between the crank arms (144a, 144b) to directly stabilize the crank arms 144 and indirectly stabilize the kneeling pad assembly 124 to the frame of the bicycle 102. A third collar fastening element (not shown) may further assemble and secure the kneeling pad assembly 124 to at least one of the seat post, seat post clamp, or loop over the top tube 108 of the frame of the bicycle 102 for further stability. The first, second, third, or any additional collar fastening elements (148a, 148b) may assemble to the frame of the bicycle 102 with an underlying protective material to prevent damage to the frame of the bicycle 102 that may be caused by clamping and/or strapping stresses or friction. The underlying protective material may be made of a protective polymeric or textile material such as tubing insulation, vacuum formed padding, or padding tape. In addition or alternatively, the fastening elements (148a, 148b) may be made of a protective material.

With reference still to FIGS. 1A-4B, a footrest 101 may be assembled to the frame of the bicycle 102 as mentioned above. The footrest 101 is generally configured to rest the foot of the user's active push leg while coasting, either straight-line coasting or in turns. The footrest 101 may further be configured to: a. reduce leg fatigue by helping hold the push leg and some upper body weight; b. improve the balance of the user and the bicycle 102; c. designed to not hinder the user, where the footrest 101 may have minimal protrusion from the frame of the bicycle 102 to not impede the user's pushing motion; d. designed to deflect the user's leg if the user is pushing close to the frame of the bicycle 102; e. adjustable to allow the user to adjust the height of the footrest 101 from the ground; and f. have a symmetric or asymmetric design, where a symmetric design may allow the user to assemble the footrest 101 on either side of the bicycle 102.

In specific embodiments, with particular attention to FIG. 4A, a footrest assembly 152 is shown. The footrest assembly 152 may include the footrest 101 and a footrest frame member 154. The footrest 101 may include a top surface 156 and a bottom surface 158, where the top surface 156 and/or bottom surface 158 may be corrugated or treated with a non-slip coating to improve the grip of the user's foot on the footrest 101. The footrest 101 may be symmetrically shaped, like a rectangle, but with rounded edges at a front end of the footrest 101 to deflect the user's push leg while operating the bicycle 102. The footrest 101 may be asymmetrically shaped, like a triangle (as best seen in FIG. 1C), to further deflect the user's push leg while operating the bicycle 102. If the footrest 101 has a triangular shape, the top surface 156 and bottom surface 158 may be inverted to permit the user to assemble the footrest 101 on either side of the bicycle. In other embodiments, the footrest 101 is custom fitted and may be canted to fit the user's preference. The footrest 101 may further include a toe clip for an extra foot location hold point. The footrest 101 may be made or a rigid polymeric material or metal.

The footrest frame member 154 may have a similar structure as the frame member 126 but on a smaller scale. In one embodiment, the footrest frame member 154 is configured to support the footrest 101 and facilitate the assembly of the footrest 101 to the frame of the bicycle 102. The footrest frame member 154 may include one or more footrest vertical portions (160a, 160b), one or more footrest horizontal portions 162 to support the footrest 101, and one or more footrest angled portions (not shown) for three-dimensional support of the footrest 101. The footrest frame member 154 may be manufactured using the techniques described above. Likewise, the footrest 101 may assemble to the footrest frame member 154 or manufactured as a single unit using the same techniques as described above for the assembly or manufacturing of the kneeling pad 100 and the frame member 126. In another embodiment, the footrest frame member 154 acts directly as a footrest 101, where an angled footrest frame or horizontal footrest frame 162 is used as the footrest. For example, a 2 inch by 2 inch aluminum alloy angled portion may work as both a part of the frame member 154 and the footrest 101.

The footrest frame member 154 may assemble to the frame of the bicycle 102 using several methods. The crank arms (144a, 144b) and kneeling pad assembly 124 may be assembled to the frame of the bicycle 102 as described above. Then, or in unison, in a particular embodiment, as best shown in FIGS. 3A-4A, a first vertical footrest frame 160a is assembled and secured to one of the first crank arm 144a or second crank arm 144b, whichever crank arm (144a, 144b) is on the opposite side of the kneeling pad 100. The first vertical footrest frame 160a may include a plurality of attachment features 142, such as holes, to align with attachment features 142 associated with the crank arm (144a, 144b), where a fastening element 149 may fasten the footrest assembly 152 to the crank arm (144a, 144b). A bracket 146 having a plurality of attachment features 142 may be assembled and secured to a rear wheel hub portion of the bicycle 102 to provide aft foot support. In one embodiment, an attachment feature 142 on one end of the bracket 146 is received on an axle 147 of the rear wheel 123, either inside or outside a dropout if present, and fastened thereto such that the bracket 146 may hang therefrom. A second vertical footrest frame 160b near a rear portion of the footrest assembly 154 is then fastened to a second attachment feature 142 of the bracket 146. Therefore, the footrest is supported by the crank arms (144a, 144b) and the bracket 146 near the rear axle 147 to utilize the strength of the bottom bike bracket 116 and the rear wheel axle and the axles connection with the dropout, if present. It should be appreciated that the first vertical portion 160a and second vertical portion 160b may be a single panel extending along a length of the footrest 101. In another embodiment, a rear portion of the footrest assembly 152 is assembled to a rear portion of the frame of the bicycle 102, such as the chainstay 118, using one or more collar fastening elements (e.g., semi-rigid strap, tube clamp, swivel clamp). The collar fastening elements may be assembled with an underlying protective material to prevent damage to the frame of the bicycle 102 as described above. In yet another embodiment, a rear derailleur may be removed from the bicycle 102 and the bracket 146 may be assembled to the rear derailleur holder to hang therefrom, where a rear vertical footrest frame 160b is assembled and fastened to an attachment feature 142 of the bracket 146.

Figure 5A:
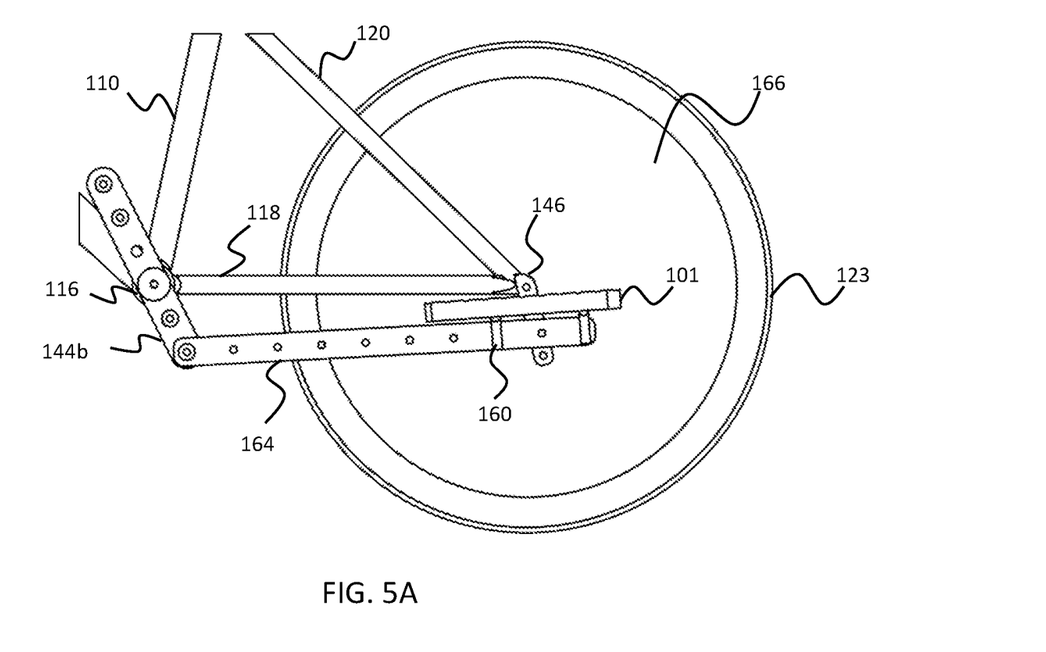
FIG. 5A is a side view thereof.
Figure 5B:
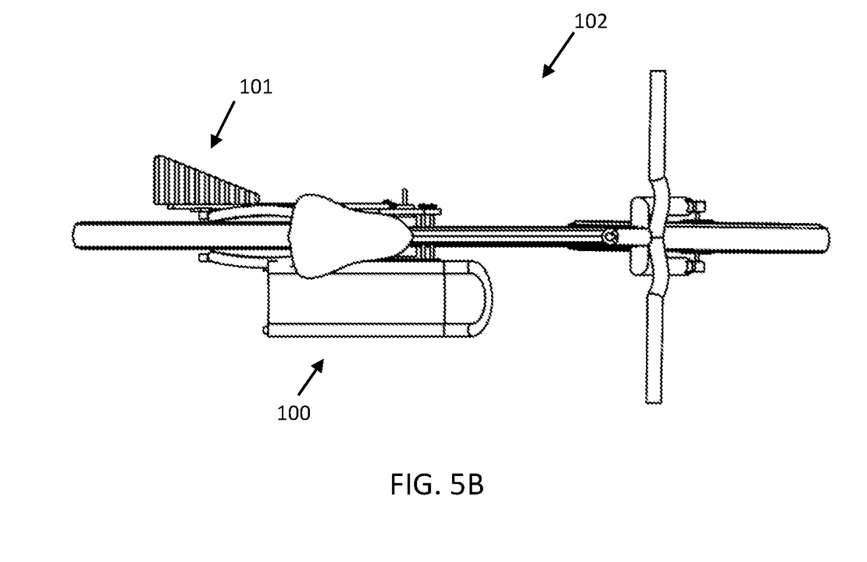
FIG. 5B is a top view thereof.

With reference to FIGS. 5A-5B, another embodiment for assembling a footrest 101 to the frame of the bicycle 102 is shown. The footrest 101 and footrest assembly 152 may be drastically reduced in size to prevent the footrest 101 from interfering with the user's active push leg while operating the bicycle 102. Here, an elongated footrest bracket 164 having a plurality of attachment features 142 may assemble to a crank arm (144a, 144b) and the bracket 146. An attachment feature 142 near one end of the horizontal footrest bracket 164 may fasten to a crank arm (144a, 144b), while an attachment feature 142 on an opposing end of the horizontal footrest bracket 164 is fastened to the bracket 146. The footrest frame member 154 may then assemble to various locations along the length of the horizontal footrest bracket 164 as desired by the user. In addition, FIG. 5A depicts an optional spoke guard 166 to prevent the user's leg or foot from getting caught in the spokes of the rear wheel 123 while operating the bicycle 102.

With reference to FIGS. 6A-8B, several other embodiments of a bicycle frame attachable kneeling pad 100 are shown and will now be described in more detail.

Figure 6A:
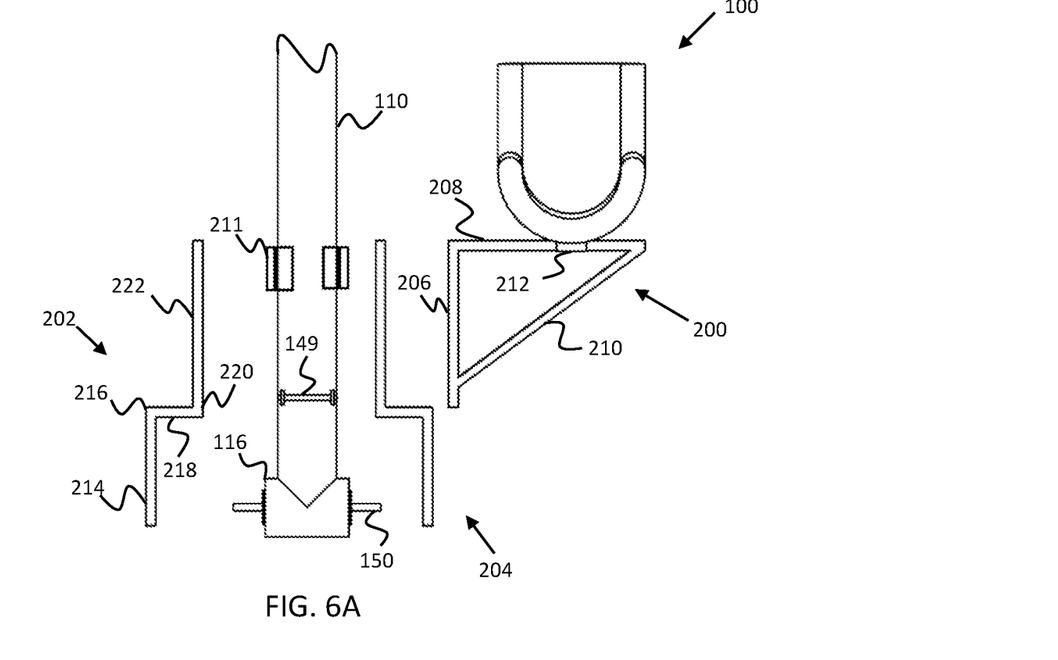
FIG. 6A is an exploded rear view thereof.
Figure 6B:
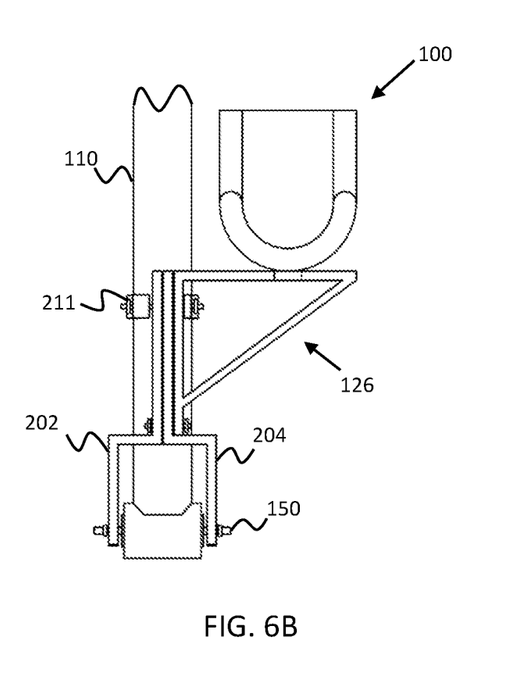
FIG. 6B is an assembled rear view thereof.
Figure 6C:
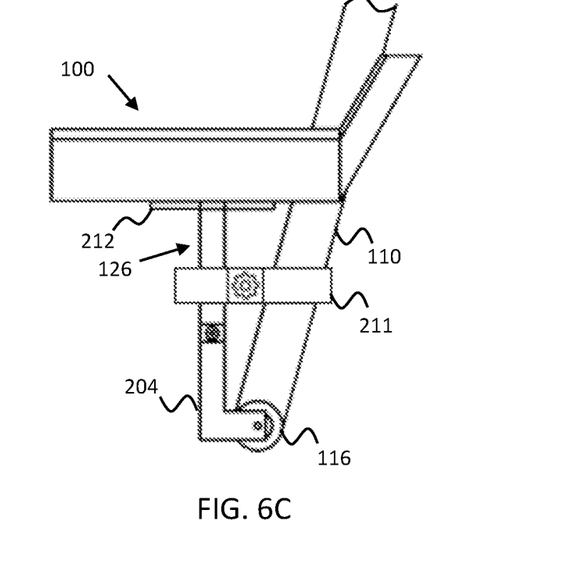
FIG. 6C is an assembled side view thereof.

FIGS. 6A-6C depicts a kneeling pad 100 having a triangle frame member 200 that assembles to a first frame member 202 and a second frame member 204, where FIG. 6A is an exploded rear view thereof, FIG. 6B is an assembled rear view thereof, and FIG. 6C is an assembled side view thereof. The triangle frame member 200 may include a vertical portion 206 to facilitate the assembly of the kneeling pad 100 to the frame of the bicycle 102, a horizontal portion 208 to support the kneeling pad 100, and an angled portion 210 connecting endwise to the vertical portion 206 and horizontal portion 208 to three-dimensionally support the kneeling pad 100. The triangle frame member 200 may further include a horizontal platform 212 disposed below and along a length of the kneeling pad 100 to structurally support the kneeling pad 100 lengthwise. The first frame member 202 and second frame member 204 are generally constructed with a first end 214 disposed to connect on one side of the spindle 150 when disposed through the bottom bracket, a first right-angular bend disposed at the first end 216, a horizontal section 218 disposed at the first right-angular bend 216, where the horizontal section 218 is disposed to run parallel the bottom bracket, a second right-angular bend 220 disposed to position approximate a longitudinal central axis of the bicycle frame seat tube 110 when the first frame member 202 is secured to said bicycle frame, and an elongate section 222 disposed at the second right-angular bend 220, where the elongate section 222 is disposed to secure to the bicycle frame seat tube 110. The first frame member 202 and second frame member 204 are mirrored structures when assembled to the bicycle 102. The first frame member 202, second frame member 204, and triangle frame member 200 may be secured with one or more fastening elements 149. In addition, a collar fastening element 211 may be disposed about the seat tube 110 to secure the first frame member 202, second frame member 204, and vertical portion 206 to the seat tube 110 for additional stability.

Figure 7A:
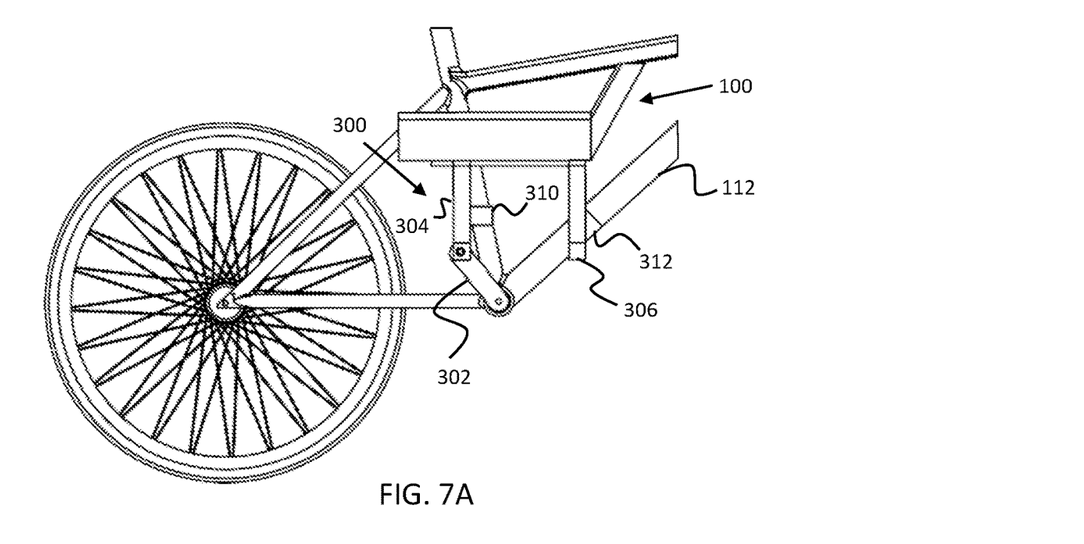
FIG. 7A is a side view thereof.
Figure 7B:
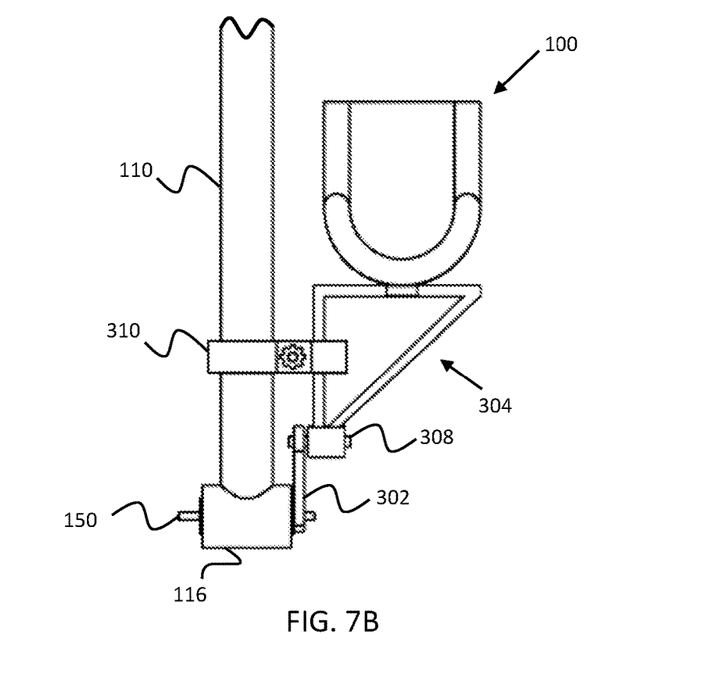
FIG. 7B is a front view thereof.

In a particular embodiment, with reference to FIGS. 7A-7B, the kneeling pad 100 is shown having a dual frame member 300 and assembled to the frame of a bicycle 102 with a single crank arm 302. The single crank arm 302 may have attributes and assemble to the frame of the bicycle 102 in the same manner as the crank arms (144a, 144b) described above. The dual frame member 300 includes at least one triangle frame member 304, where the triangle frame 304 may have similar attributes and structure as the aforementioned frame members (126, 200). The single crank arm 302 is assembled to the frame of the bicycle 102 on the same side as the kneeling pad 100. One end of the single crank arm 302 assembles to the spindle 150 associated with the bottom bike bracket 116, while an opposing end of the crank arm 302 assembles to the triangle frame member 304 by way of a fastening element 308 (e.g., pin, nut and bolt, screw). A first collar fastening element 310 may assemble about the seat tube 110 and couple to the triangle frame assemble 304 to fix the single crank arm 302 and support the kneeling pad 100 to the frame of the bicycle 102. The dual frame member 300 may further include at least one a secondary frame member 306, which may be a second triangle frame member, a vertical portion, a horizontal portion, or an angled portion. The secondary frame member 306 is offset longitudinally from the first triangle frame member 304. The secondary frame member 306 may assemble to the down tube 112 via a second collar fastening element 312 to aid in fore/aft and side-to-side kneeling pad 100 stability. The location of the collar fixation elements (310, 312) and their connection the dual frame member 300 may vary based on the size and type of the bicycle frame and/or to adjust the position of the kneeling pad 100 to a desired position. Likewise, the single crank arm 302 may be fixed fore, at, or aft of the seat tube 110.

Figure 8A:
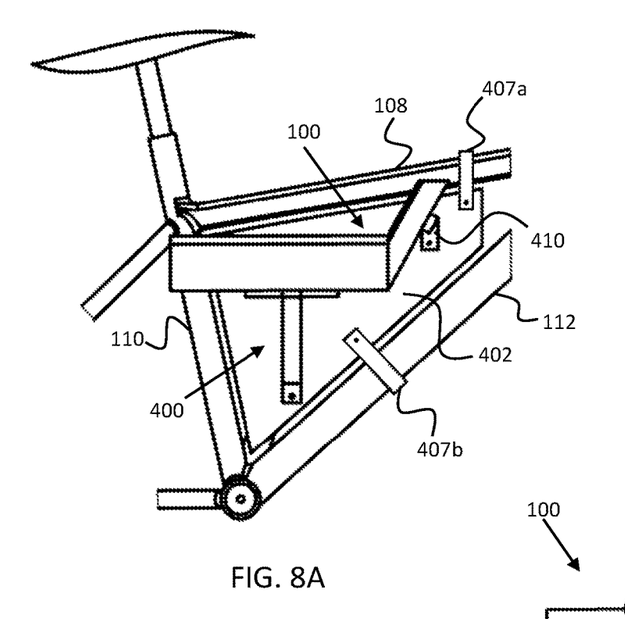
FIG. 8A is a side view thereof.
Figure 8B:
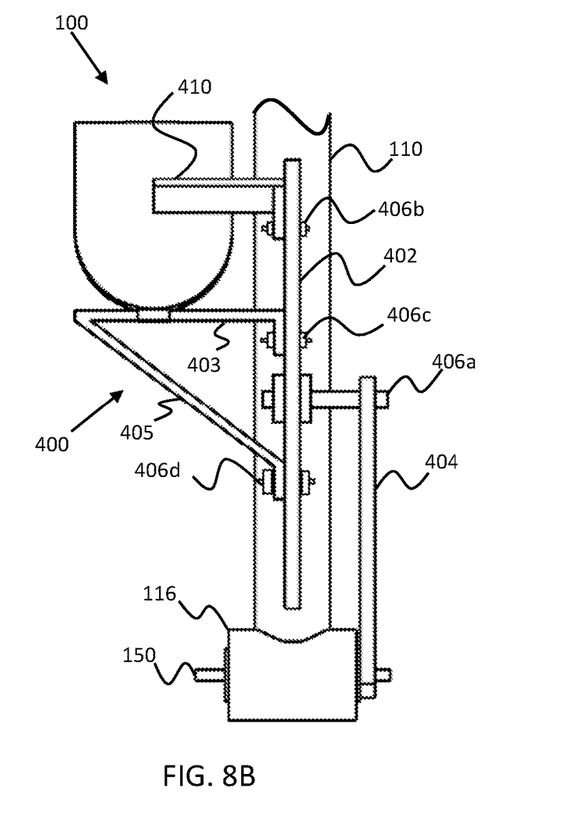
FIG. 8B is a front view thereof.

In a specific embodiment, with reference to FIGS. 8A-8B, the kneeling pad 100 is shown attached to the frame of a bicycle by way of a panel mount 402, where FIG. 8A is a side view thereof and FIG. 8B is a front view thereof. The panel mount 402 is configured to assemble the kneeling pad 100 to the frame of the bicycle. In one embodiment, the panel mount is an elongated body having an uppermost edge disposed to underlie the top tube 108 of the frame of the bicycle 102, an angled edge disposed to overlie the down tube 112 of the frame of the bicycle 102, a rearmost edge disposed to run parallel the seat tube 110 of the frame of the bicycle 102. In another embodiment, the panel mount 402 may be mounted on the side of the frame of the bicycle to allow the panel mount 402 to span beyond the seat tube 110, top tube 108, and/or down tube 112. The panel mount may be secured to frame of the bicycle 102 with a crank arm 404 and one or more fastening elements (406, 407). The crank arm 404, having similar attributes and structure as the aforementioned crank arms (144a, 144b, 302), may assemble to the spindle 150 on an opposing side of the kneeling pad and be secured to the panel mount 402 with a first fastening element 406a. Further, one or more collar fastening elements (407a, 407b) may assemble and secure the panel mount 402 to at least one of the top tube 108, down tube 112, and seat tube 110. A panel frame member 400 is configured to support the kneeling pad 100 and facilitate the assembly of the kneeling pad 100 to the panel mount 402. The panel frame member 400 may have similar attributes and structure as the aforementioned frame assemblies (126, 200, 300). However, in a particular embodiment, a panel frame member 400 does not include a vertical portion. Rather, a horizontal portion 403 and angled portion 405 attach directly to the panel mount 402 to provide space to accommodate the securement of the crank arm 404 to the panel mount 402. Thus, the panel frame member 400 may be secured to the panel mount 402 at several connection points with fastening elements (406c, 406d). In addition, the kneeling pad 100 may further include an upper leg rest frame 410. The upper leg rest frame 410 may be assembled and secured to the panel mount with an additional fastening element 406b. The upper leg rest frame 410 provides additional fore/aft stability to upper leg rest portion 130 of the kneeling pad 100. Finally, the panel mount 402 may be made of a solid piece of rigid or semi-rigid material or built from bars or tubes.

In a particular embodiment, a training wheel is assembled to the bicycle 102 for user stability assistance. The training wheel may be mounted on the kneeling pad 100 side of the bicycle 102 opposite from the user's push leg. The training wheel is configured to provide fall protection when leaning and turning to support the kneeling pad 100 side. The training wheel is advantageous as it provides mental and emotional confidence while operating the bicycle 102 and provides emotional comfort to the friends or family members of the user. In one embodiment, the training wheel may be a conventional training wheel like on a children's bicycle. In another embodiment, the training wheel is a performance training wheel. The performance training wheel may have a larger diameter and width than a typical training wheel and filled with air rather than made of solid rubber. The performance training wheel is built to function at higher rates with little to no wobble. The performance training wheel is preferably mounted to solid frame mount points unlike traditional training wheel. In addition, the user may adjust the height to engage the ground surface at a chosen angle. And finally, the training wheel may be removed as the user gains bicycle-coasting confidence.

Other Embodiments

While at least one exemplary embodiment has been presented in the foregoing detail description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

What is claimed is:

1. A bicycle frame attachable kneeling pad comprising a frame assembly attachable to a bicycle frame supportive of a kneeling pad dispositional at one side of the bicycle frame at a height and position appropriate for engaging a user's knee and foreleg thereupon while riding the bicycle, wherein the frame assembly comprises a frame member and a plurality of assembly components including a first crank arm attachable to the bicycle frame through a bottom bracket of said bicycle frame and at least one collar fastening element for securing a tube of the bicycle frame to the frame assembly, and wherein said user is enabled to kneel upon one knee and propel the bicycle by striding action effected by said user's other leg.

2. The bicycle frame attachable kneeling pad of claim 1 wherein the frame member is attachable to the first crank arm and secured thereto parallel to the bicycle frame to position the kneeling pad on one or alternately the other side of a bicycle approximately midway between a saddle of the bicycle and a ground surface upon which said bicycle is uprightly disposed.

3. The bicycle frame attachable kneeling pad of claim 2 wherein the plurality of assembly components comprises the first crank arm attachable to a first side of the bicycle frame through the bottom bracket of said bicycle, and a second crank arm attachable to an opposing side of the bicycle frame through the bottom bracket, wherein the first crank arm and second crank arm are cross-connected with one or more fastening elements traversing between the first crank arm and second crank arm to improve the stability of the kneeling pad when attached to the bicycle frame.

4. The bicycle frame attachable kneeling pad of claim 3 wherein the first crank arm and second crank arm assemble to a spindle associated with the bottom bracket of the bicycle.

5. The bicycle frame attachable kneeling pad of claim 4 further comprising a footrest disposed upon an opposing side of the bicycle frame to which the kneeling pad is attached, said footrest attachable to at least one of the first crank arm, the second crank arm, a rear wheel axle, or a rear derailleur hanger wherein a user propelling the bicycle by striding action of one leg, while kneeling on the kneeling pad with the other leg, may rest said one leg while coasting the bicycle whereby said user's weight is more evenly distributed over the bicycle frame.

6. The bicycle frame attachable kneeling pad of claim 4 further comprising a training wheel disposed upon a side of the bicycle frame to which the kneeling pad is attached, said training wheel mountable to at least one of the first crank arm, second crank arm, frame member, or kneeling pad wherein a user leaning into the kneeling pad with one leg, while coasting or propelling the bicycle, is prevented from toppling off the bicycle due to contact of the training wheel with the ground surface.

7. The bicycle frame attachable kneeling pad of claim 3 wherein the at least one collar fastening element is disposed to secure around a seat tube of the bicycle frame and couple to one or more of the fastening elements traversing between the first crank arm and second crank arm to secure the frame member to the seat tube.

8. The bicycle frame attachable kneeling pad of claim 3 wherein the frame member further comprises:
a vertical portion disposed parallel to the bicycle frame, said vertical portion attachable to either the first crank arm or second crank arm;
a first kneeling pad assembly portion disposed parallel to a longitudinal axis of the kneeling pad, a second kneeling pad assembly portion disposed parallel to the longitudinal axis of the kneeling pad and horizontally offset from the first kneeling pad such that the kneeling pad is cradled between the first kneeling pad assembly portion and second kneeling pad assembly portion; and an angled portion endwise connecting the vertical portion and second kneeling pad assembly portion together to provide three dimensional support to the kneeling pad.

9. The bicycle frame attachable kneeling pad of claim 3 wherein the frame member comprises:
   a vertical portion disposed parallel to a sagittal plane of the bicycle frame and attachable to either the first crank arm or second crank arm;
   a horizontal portion disposed to position in a transverse plane relative a seat tube; and
   an angled portion endwise connecting the vertical and horizontal portions together to provide three dimensional support the kneeling pad.

10. The bicycle frame attachable kneeling pad of claim 3 wherein the kneeling pad is removably securable to the frame member or rotatable about the frame member to permit the user to position and secure the upper leg rest portion towards a front of the bicycle depending on which side the user desires to assemble the kneeling pad to the bicycle frame.

11. The bicycle frame attachable kneeling pad of claim 3 wherein the kneeling pad further comprises a lower leg portion for engaging a user's lower leg thereupon while riding the bicycle, and an upper leg portion disposed in front of the lower leg portion and angled upwards for engaging a user's upper leg thereupon to prevent the user from sliding forward.

12. The bicycle frame attachable kneeling pad of claim 11 wherein the lower leg portion has a concave shape to cradle the user's lower leg.

13. The bicycle frame attachable kneeling pad of claim 1 wherein the kneeling pad further comprises a padded portion disposed on top of a supporting portion, the padded portion formed of one or more polymeric or textile materials to provide a comfortable surface on which the user can rest their leg, and the support portion formed of one or more rigid or semi-rigid polymeric materials or metals to support the padded portion.

14. A bicycle frame attachable kneeling pad comprising a frame assembly attachable to a bicycle frame supportive of a kneeling pad dispositional at one side of the bicycle frame at a height and position appropriate for engaging a user's knee and foreleg thereupon while riding the bicycle, wherein said user is enabled to kneel upon one knee and propel the bicycle by striding action effected by said user's other leg, and wherein the frame assembly comprises:
   a first frame member and a second frame member attachable to the bicycle frame through a bottom bracket of said bicycle frame;
   a triangular frame member attachable to the first frame member, said triangular frame member securable in transverse relation to the bicycle frame whereon the kneeling pad is securable atop a horizontally disposed side of the triangular frame member; and
   at least one collar fastening element disposed to secure around a seat tube of the bicycle frame and secure the first frame member, second frame member, and triangular frame member to the seat tube;
   wherein the frame member secures to the bicycle frame parallel the bicycle frame seat tube to position the kneeling pad on one or alternately the other side of a bicycle approximately midway between a saddle of the bicycle and a ground surface upon which said bicycle is uprightly disposed.

15. The frame member of claim 14 wherein the first frame member and second frame member include:
   a first end disposed to connect on one side of a spindle when disposed through the bottom bracket;
   a first right-angular bend disposed at the first end;
   a horizontal section disposed at the first right-angular bend, said horizontal section disposed to run parallel the bottom bracket;
   a second right-angular bend disposed to position approximate a longitudinal central axis of the bicycle frame seat tube when the first frame member is secured to said bicycle frame;
   an elongate section disposed at the second right-angular bend, said elongate section disposed to secure parallel to the bicycle frame seat tube;
   a second end disposed endwise upon the elongate section;
   at least one first fastening element securable through a hole disposed through the elongate section proximal the second right-angular bend; and
   the at least one collar fastening element disposed securable around the bicycle frame seat tube and coupling with the elongate section of the first frame member and the second frame member to secure the first frame member and second frame member to the seat tube;
   wherein the triangular frame member secures to the first frame member and second frame member by interconnection with the at least one first fastening element and the at least one collar fastening element.

16. The bicycle frame attachable kneeling pad of claim 15 wherein the frame assembly further includes:
   wherein the at least one collar fastening element includes a second collar fastening element disposed to secure about a down tube of the bicycle frame in a position appropriate to engage and securely support a third frame member disposed at a front end of the kneeling pad;
   wherein the kneeling pad is horizontally supported by the triangular frame member and the third frame member whereby weight of a user kneeling upon the kneeling pad during operation of the bicycle is borne upon a pedal crank, the seat tube, and the down tube.

17. A bicycle frame attachable kneeling pad comprising a frame assembly attachable to a bicycle frame supportive of a kneeling pad dispositional at one side of the bicycle frame at a height and position appropriate for engaging a user's knee and foreleg thereupon while riding the bicycle, wherein said user is enabled to kneel upon one knee and propel the bicycle by striding action effected by said user's other leg, and wherein the frame assembly attaches to a pedal crank of the bicycle, the frame assembly comprising:
   a pedal pin dispositional through the pedal crank of the bicycle when a pedal has been removed therefrom;
   a triangular frame member attachable endwise to the pedal pin, said triangular frame member having:
      a vertical portion disposed to position parallel a bicycle seat tube;
      a horizontal portion disposed to position in a transverse plane relative the seat tube;
      an angled portion endwise connecting the vertical and horizontal portions together; and
      a collar fastening element disposed to secure about the seat tube and secure the vertical portion in parallel relation thereto;
   wherein the kneeling pad is disposed upon the horizontal portion and weight of a user kneeling upon the kneeling pad during operation of the bicycle is borne upon the pedal crank and the seat tube.

18. A bicycle frame attachable kneeling pad comprising a frame assembly attachable to a bicycle frame supportive of a kneeling pad dispositional at one side of the bicycle frame at a height and position appropriate for engaging a user's knee and foreleg thereupon while riding the bicycle, wherein said user is enabled to kneel upon one knee and propel the bicycle by striding action effected by said user's other leg, and wherein the frame assembly comprises:
- a planar mount disposed to mount to the bicycle frame in position aligned within the space bounded by a top tube, a down tube, and a seat tube of the bicycle frame, said planar mount including:
  - an uppermost edge disposed to underlie the top tube of the bicycle frame;
  - an angled edge disposed to overlie the down tube of the bicycle frame;
  - a rearmost edge disposed to run parallel the seat tube;
  - a plurality of collar fastening elements disposed to secure said planar mount to the top tube at the uppermost edge and the down tube at the angled edge;
- a crank fastening element disposed to secure a pedal crank of the bicycle in a vertically oriented position projected above a bottom bracket of the bicycle frame; and
- a triangular frame disposed to secure to the planar mount on an opposite side of the planar mount relative the pedal crank, said triangular frame member including:
  - a plurality of fastening elements disposed to secure to a planar portion;
  - a horizontal portion connected to one of the plurality of fastening elements, said horizontal portion disposed normal the planar mount in a transverse plane relative the planar mount;
  - an angled portion disposed endwise connected between the horizontal portion and another of the plurality of fastening elements; and
- a second frame disposed and attached to the planar mount in a position to securely support a front end of the kneeling pad;
- wherein the kneeling pad is horizontally disposed upon the triangular frame and the second frame and weight of a user kneeling upon the kneeling pad during operation of the bicycle is borne upon the pedal crank, planar mount, triangular frame and second frame and thereby distributed through the bicycle frame.

\* \* \* \* \*